United States Patent [19]

Stephens

[11] Patent Number: 5,183,281
[45] Date of Patent: Feb. 2, 1993

[54] BICYCLE FRAME ELEMENT PROTECTOR

[76] Inventor: David M. Stephens, 16026 N. 8th St., Phoenix, Ariz. 85022

[21] Appl. No.: 669,928

[22] Filed: Mar. 15, 1991

[51] Int. Cl.$^5$ .............................................. B62K 21/02
[52] U.S. Cl. .................................. 280/279; 280/288.4; 280/304.3; D12/118; D12/126
[58] Field of Search ...................... 280/279, 276, 288.4, 280/281.1, 304.3; D12/111, 117, 118, 126

[56] References Cited

U.S. PATENT DOCUMENTS

| | | | |
|---|---|---|---|
| D. 89,132 | 3/1933 | Lewis | D12/111 |
| D. 100,958 | 8/1936 | Mankki | D12/111 |
| D. 182,821 | 5/1958 | Kelley | D12/118 |
| D. 236,336 | 8/1975 | Seifert | D12/118 |
| D. 295,396 | 4/1988 | Rudd et al. | D12/126 |
| D. 313,774 | 1/1991 | Hauer | D12/126 |
| 660,875 | 10/1900 | Wambach | 280/279 |
| 680,493 | 8/1901 | Meunier | 280/279 |
| 1,159,596 | 11/1915 | McCartha | 280/279 |
| 1,221,823 | 4/1917 | Bowker | 280/279 |
| 1,559,277 | 10/1925 | Nelson | 280/279 |
| 1,995,795 | 3/1935 | Clark | 280/288.4 |
| 2,160,035 | 5/1939 | Schwinn | 280/279 |
| 2,236,127 | 3/1941 | Alexander | 280/279 |
| 4,046,397 | 9/1977 | Kitrell | 280/288.4 |
| 4,103,922 | 8/1978 | Brilando | 280/279 |
| 4,421,338 | 12/1983 | Isono et al. | 280/279 |

Primary Examiner—Mitchell J. Hill
Attorney, Agent, or Firm—Cahill, Sutton & Thomas

[57] ABSTRACT

Apparatus for protecting a vehicular frame element against denting, scratching and gouging includes a plurality of detachably attachable standoffs extending from the frame element for supporting a protective member displaced from and generally aligned with the frame element.

23 Claims, 1 Drawing Sheet

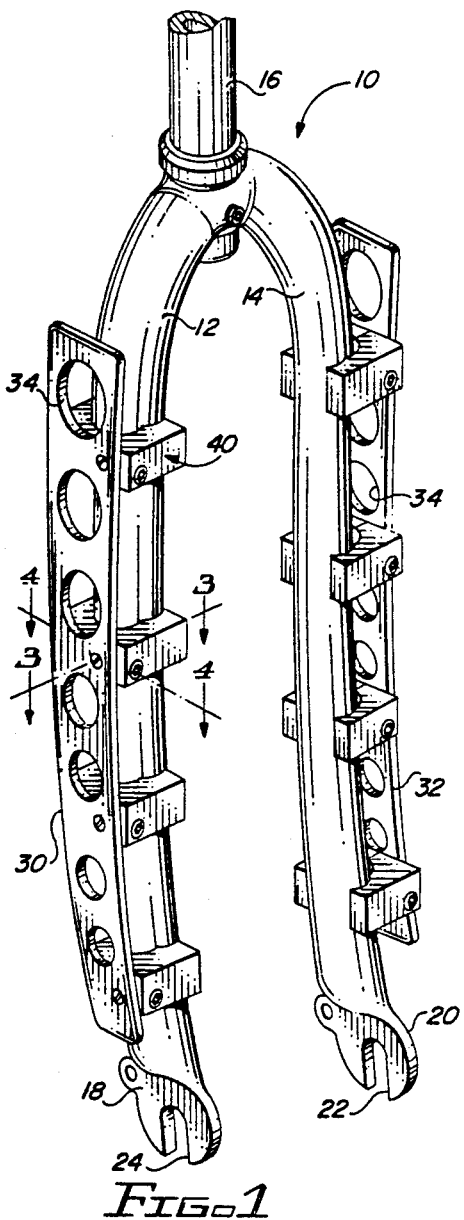
FIG. 1
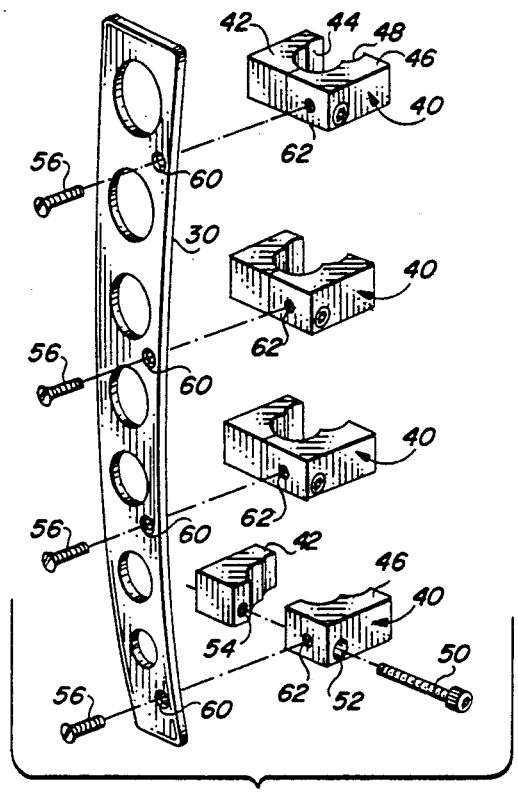
FIG. 2
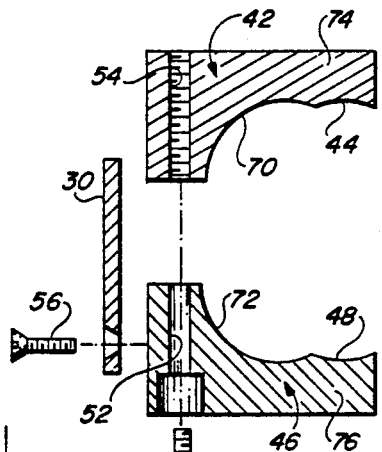
FIG. 5
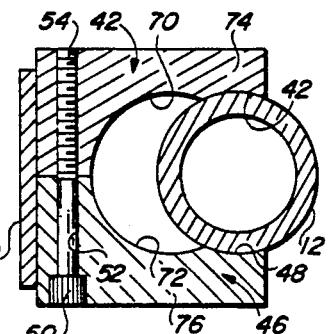
FIG. 3
FIG. 4

BICYCLE FRAME ELEMENT PROTECTOR

BACKGROUND OF THE INVENTION

1. Field of the Invention

The present invention relates to protective devices for vehicles and, more particularly, to a protective member for protecting the front fork of a bicycle.

2. Description of Related Art

For the most part, the frame element of bicycles are made of tubular stock which may be of constant diameter or tapered, depending upon the structural function and location of the frame element. The front fork of a bicycle, rotatably attached to the frame, is usually constructed of a longitudinally smoothly bent tapered tubular element. During normal use of bicycle, the front fork is subjected to substantial jolts which are a function of the speed of the bicycle and the size of the obstruction struck by the front tire and wheel. Various devices have been made for the purpose of augmenting the strength of the front fork. These strength augmenting devices include generally aligned secondary struts extending from the wheel hub to a location adjacent the attachment of the handle bar post. Other configurations extend only for a portion of the length of the fork itself. These strength augmenting devices may be straight or curved and are usually of tubular construction. Variations of such strength augmenting devices include the use of bifurcated or trifurcated fork elements.

Without question, all of these strength augmenting devices do provide an additional robustness to the front fork of a bicycle. However, additional weight is added. The additional weight is particularly detrimental to bicycles referred to as mountain bikes which are used to traverse mountain trails and virgin areas which are generally hilly. Any added weight will be detrimental to the sustained speed possible and rapidity of acceleration and deceleration necessary to negotiate an obstruction filled pathway.

Tubular members are used in bicycles because such members provide a very acceptable strength to weight ratio. That is, the strength of a tubular member is a function of the diameter of the member and the thickness of the cylindrical wall for any give alloy. When the integrity of the wall is compromised, such as by a dent or a gouge, a concentration of stresses occur and failure of the tubular member at the location of the dent or gouge is likely. The strength augmenting devices previously used only incidentally provide protection to the front fork against denting or gouging. Their primary function is that of affording brute strength with little finesse.

SUMMARY OF THE INVENTION

The front fork of a mountain bike traversing across pathways or unimproved terrain is subjected to impacts from rocks, trees and other man made or naturally occurring elements. Such inadvertent unintended contact has a likelihood of denting or gouging the front fork. Damage of this type will comprise the structural integrity of the front fork and increase the likelihood of failure at a critical moment to the detriment of the rider. To avoid such damage, a protective member is mounted upon standoffs clamped to each leg of the front fork. These protective members tend to shield the front fork against damaging contact by foreign elements. Denting or bending of the protective member resulting from damaging contact will have no effect upon the integrity of the front fork. Furthermore, the dented or gouged protective member will still continue to serve its primary protective function.

It is therefore a primary object for the present invention to provide protective members for the elements of a vehicular frame.

Another object of present invention is to provide a pair of protective members for the legs of the front fork of a bicycle.

Yet another object of the present invention is to provide a detachably attached protective member for each leg of the front fork of a bicycle.

Yet another object of the present invention is to provide a protective member which is attached to but spaced apart from each leg of a bicycle fork.

A further object of the present invention is to provide a protective member for each leg of a bicycle front fork which is displaced therefrom sufficiently to absorb denting and gouging while preventing direct impact upon the leg.

A yet further object of the present invention is to provide lightweight protective members for the front fork of a bicycle.

A yet further object of the present invention is to provide a method for protecting the frame elements of a vehicle.

These and other objects of the present invention will become apparent to those skilled in the art as the description there proceeds.

BRIEF DESCRIPTION OF THE DRAWINGS

The present invention will be described with great specificity and clarity with reference to the following drawings, in which:

FIG. 1 is a prospective view of protective members mounted upon the front fork of a bicycle;

FIG. 2 is an isometric view of a protective element and its standoffs;

FIG. 3 is a cross-sectional view taken along the lines 3—3, as shown in FIG. 1;

FIG. 4 is a cross-sectional view taken along lines 4—4, as shown in FIG. 1; and

FIG. 5 is an exploded view of the components of a standoff and a partial view of the protective member.

DESCRIPTION OF THE PREFERRED EMBODIMENT

Referring to FIG. 1, there is illustrated a typical front fork of a bicycle. The upper ends of each of legs 12, 14 merge and join stem 16, as is conventional. Terminal ends 18, 20 of legs 12, 14, respectively, include slots 22, 24 for receiving the axle of the front wheel. Legs 12, 14 may be slightly curved, as illustrated, and are formed of tubular material of any one of numerous alloys or man made materials presently in use. These alloys include exotic high strength alloys which permit very thin walled tubing as well as more conventional alloys requiring somewhat thicker walled tubing to provide the requisite strength for the loads anticipated. No matter what the alloy or material of the tubing, the strength of the tubing is drastically reduced if an impact or force applied to the tubing results in denting or gouging of the tubing.

A bicycle, particularly a bicycle known as a mountain bike, is used to traverse slightly improved or unimproved terrain. Such terrain is replete with obstructions and impediments, including rocks and trees. Inadvertent impact by the front fork with these elements has a likelihood of denting or gouging the front fork. Failure may occur immediately or at some later point in time upon application of a substantial load. Such failure will not only damage the mountain bike but potentially cause serious injury to the rider. Even if no injury results, the inconvenience to the rider in having an inoperative bike far from civilization is substantial.

To protect the legs of the front fork, a pair of protective members 30, 32 may be used. Each protective member may be of sheet-like material as illustrated. A plurality of lightening holes 34 may be developed in each protective member to reduce its mass without compromising its protective capability. The number and size of such lightening holes are, necessarily, a function of the alloy or material from which the protective members are made. While the protective members are shown as planar, they may be curved about their longitudinal axis to partially or even completely encircle the respective leg of the front fork. However, it has been learned that planar side mounted protective members provide sufficient protection under all but extreme, and unlikely, conditions.

A plurality of essentially identical standoffs 40, as particularly shown in FIG. 2, interconnect a leg of front fork 10 with its respective protective member (30, 32). The standoff may be a two part clamp-like device. Clamp element 42 includes a recess 44 configured to mate with a segment of the longitudinally aligned surface of one of the legs of front fork 10; see also FIGS. 3 and 4. Similarly, clamp element 46 includes a recess 48 to mate with an opposing longitudinal segment of a leg of front fork 10. The two clamp elements are secured to one another and exert a gripping force upon the supporting leg by a bolt 50 extending through passageway 52 in clamp element 46 and into threaded engagement with threaded passageway 54 of clamp element 42, as illustrated in FIG. 5. By appropriate dimensioning of the respective clamp elements, threaded engagement of bolt 50 will drawn the two clamp elements into frictional engagement with the respective opposed longitudinal segments of the leg of the front fork to which the standoff is attached.

The protective element, such as protective element 30, is attached to each of clamp elements 40 by bolts 56 penetrably engaging apertures 60 of the protective member. Each of these bolts threadedly engages threaded cavity 72 of each of standoffs 40.

As particularly illustrated in FIGS. 3, 4 and 5, clamp element 42 may include an additional recess 70, which recess is not in contact with the surface of an arm of front fork 10. Similarly, clamp element 46 may include a recess 72. These recesses provide some flexibility to arm 74 of clamp element 42 extending laterally from threaded passageway 54 and to arm 76 of clamp element 46 extending laterally from passageway 52. The resulting somewhat flexible nature of the arms of the clamp elements assists in insuring a continuing clamping force upon the clamped leg of the front fork. It also permits slight flexing of the arm of each clamp element to accommodate unequal curvature of the opposed sides of the leg due to the bowed configuration of the leg. Necessarily, opposed mating surfaces 80, 82 of clamp elements 42, 46 must be spaced apart far enough from one another upon attachment of standoff 40 to permit engagement of recesses 44, 46 with respective leg 12 prior to mating of the opposed mating surfaces in order to permit continuing gripping engagement of the clamp elements with the leg.

It is to be understood that recesses 44, 46 do not exactly have to mate with the corresponding curvature of the leg of the front fork. Preferably, as much surface area as possible should grip the leg but even a small area of contact is sufficient to robustly attach the standoff.

While the above description, in combination with the drawings, has been focused upon the front fork of the frame of a bicycle, other segments of the frame may be similarly protected. That is, the upper or lower or both of the rear forks supporting the rear wheel may be similarly protected. Additionally, one or more of the elements of the main frame may be protected. As a practical matter, the need for protecting elements of the bicycle frame other than the front fork is substantially less since they are usually not as subject to impact by foreign elements as the front fork. Moreover, similar protective members can be used on motorcycles and other vehicles of tubular framework construction.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Apparatus for protecting a frame element of a vehicular frame, said apparatus comprising in combination:
   a) a protective member for shielding the frame element against denting and gouging;
   b) at least one standoff for attaching said protective member to the frame element;
   c) means for clamping said standoff to the frame element; and
   d) means for securing the protective member to said standoff.

2. The apparatus as set forth in claim 1 including a plurality of said standoffs for attaching said protective member at a corresponding plurality of locations along the frame element.

3. The apparatus as set forth in claim 2 wherein said securing means includes means for rigidly securing said protective member to each standoff of said plurality of standoffs.

4. The apparatus as set forth in claim 2 wherein said clamping means includes means for frictionally clamping each of said standoffs with the frame element.

5. The apparatus as set forth in claim 4 including a plurality of said standoffs for attaching said protective member at a corresponding plurality of locations along the frame element.

6. The apparatus as set forth in claim 1 wherein the frame element is a dual legged front fork of a bicycle and wherein one of said protective members is secured to each leg of the front fork by at least one of said standoffs.

7. The apparatus as set forth in claim 6 wherein each of said protective members is configured to replicate the longitudinal curvature of the corresponding leg of the front fork.

8. The apparatus as set forth in claim 7 including a plurality of standoffs for attaching each of said protective members to the corresponding leg of the front fork.

9. The apparatus as set forth in claim 8 wherein each of said standoffs retains the respective one of said protective members in spaced apart relationship with the corresponding leg of the front fork.

10. The apparatus as set forth in claim 1 wherein each said standoff comprises a pair of opposed clamp elements, each clamp element of said pair of clamp elements having a recess for contacting a segment of the frame element.

11. The apparatus as set forth in claim 10 including a plurality of pairs of said clamp elements and wherein said clamping means comprises means for drawing each pair of said clamp elements toward one another to engage the frame element.

12. The apparatus as set forth in claim 10 wherein each of said clamp elements includes a flexible section supporting said recess.

13. The apparatus as set forth in claim 10 wherein said securing means comprises means for securing said protective member to a pair of said clamp elements.

14. The apparatus as set forth in claim 13 wherein said securing means comprises means for securing said protective member to a clamp element of a pair of said clamp elements.

15. The apparatus as set forth in claim 1 wherein said protective member is an elongated plate.

16. The apparatus as set forth in claim 15 wherein said protective member includes a plurality of lightening holes.

17. The apparatus as set forth in claim 15 wherein the plan form of said plate replicates the longitudinal curvature of the protected leg of the front fork.

18. Apparatus for protecting a leg of the front fork of a two wheeled vehicular frame and which leg includes a lateral outer side, said apparatus comprising in combination:
 a) means extending adjacent the leg for shielding and protecting the lateral outer side of the leg against denting and gouging;
 b) means detachably attachable to at least two locations along the leg for supporting said shielding and protecting means; and
 c) means for securing said shielding and protecting means to said supporting means.

19. The apparatus as set forth in claim 18 including a plurality of said supporting means disposed at each of the locations along the leg.

20. The apparatus as set forth in claim 19 wherein said supporting means includes means for clampingly engaging the leg.

21. The apparatus as set forth in claim 20 wherein said securing means includes means for detachably attaching said shielding means with said plurality of supporting means.

22. A method for protecting a leg of the front fork of a two wheeled vehicle against denting and gouging, said method comprising the steps of:
 a) attaching a plurality of standoffs in spaced apart relationship along the protected leg;
 b) positioning a protective member in general alignment with the protected leg; and
 c) securing the protective member to each of the standoffs.

23. The method as set forth in claim 22 wherein said step of attaching includes the step of clamping each standoff to the protected leg.

* * * * *